(12) United States Patent
Klier

(10) Patent No.: US 10,235,763 B2
(45) Date of Patent: Mar. 19, 2019

(54) DETERMINING OPTICAL FLOW

(71) Applicant: Google Inc., Mountain View, CA (US)

(72) Inventor: Peter Z. Klier, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 167 days.

(21) Appl. No.: 15/366,118

(22) Filed: Dec. 1, 2016

(65) Prior Publication Data

US 2018/0158194 A1   Jun. 7, 2018

(51) Int. Cl.
G06K 9/00 (2006.01)
G06T 7/20 (2017.01)
G06T 7/40 (2017.01)

(52) U.S. Cl.
CPC .......... *G06T 7/2066* (2013.01); *G06T 7/2033* (2013.01); *G06T 7/408* (2013.01); G06T 2207/10024 (2013.01)

(58) Field of Classification Search
CPC ...... G06T 7/2066; G06T 7/2033; G06T 7/408
USPC .......................................... 382/107
See application file for complete search history.

(56) References Cited

U.S. PATENT DOCUMENTS

| | | | |
|---|---|---|---|
| 5,987,164 A | 11/1999 | Szeliski et al. | |
| 6,018,349 A | 1/2000 | Szeliski et al. | |
| 6,044,181 A | 3/2000 | Szeliski et al. | |
| 6,148,056 A | 11/2000 | Lin et al. | |
| 6,157,677 A | 12/2000 | Martens et al. | |
| 6,795,578 B1 * | 9/2004 | Kotani | G06T 9/20 375/240.16 |
| 6,917,721 B2 | 7/2005 | Elad et al. | |
| 7,116,831 B2 | 10/2006 | Mukerjee et al. | |
| 7,317,839 B2 | 1/2008 | Holcomb | |
| 7,352,905 B2 | 4/2008 | Mukerjee et al. | |
| 7,620,109 B2 | 11/2009 | Srinivasan | |
| 7,715,589 B2 | 5/2010 | Freeman et al. | |
| 7,852,936 B2 | 12/2010 | Mukerjee et al. | |
| 8,064,520 B2 | 11/2011 | Mukerjee et al. | |
| 9,008,363 B1 * | 4/2015 | Klier | G06T 7/269 382/103 |
| 9,819,841 B1 * | 11/2017 | Denisenko | H04N 5/144 |
| 2004/0091170 A1 * | 5/2004 | Cornog | G06T 13/80 382/276 |
| 2005/0041842 A1 | 2/2005 | Frakes et al. | |
| 2007/0122058 A1 * | 5/2007 | Kitaura | G06T 7/579 382/284 |
| 2008/0232643 A1 | 9/2008 | Leichter et al. | |
| 2009/0079876 A1 | 3/2009 | Takeshima et al. | |
| 2009/0310681 A1 * | 12/2009 | Gaude | G06T 7/238 375/240.16 |

(Continued)

OTHER PUBLICATIONS

Aires et al., "Optical Flow Using Color Information: Preliminary Results". Proceedings of the 2008 ACM Symposium on Applied Computing, Mar. 16-20, 2008, Fortaleza, Ceara, Brazil, pp. 1607-1611.

(Continued)

*Primary Examiner* — Van D Huynh
(74) *Attorney, Agent, or Firm* — Dority & Manning, P.A.

(57) ABSTRACT

Systems and methods of determining optical flow are provided. For instance, a plurality of input color vectors respectively associated with a plurality of input pixels can be obtained. Each input pixel can have a known position within an image. A color rate of change associated with each input pixel in the image can be obtained. An optical flow estimate associated with a subject pixel within the image can be determined based at least in part on the plurality of input color vectors and the color rates of change associated with the input pixels in the image.

20 Claims, 5 Drawing Sheets

(56) References Cited

U.S. PATENT DOCUMENTS

| | | | |
|---|---|---|---|
| 2010/0124361 A1 | 5/2010 | Gaddy | |
| 2011/0050864 A1 | 3/2011 | Bond | |
| 2011/0063473 A1 | 3/2011 | Tsunekawa et al. | |
| 2011/0206236 A1 | 8/2011 | Center, Jr. | |
| 2012/0050074 A1 | 3/2012 | Bechtel et al. | |
| 2012/0148110 A1 | 6/2012 | Chen | |
| 2013/0176445 A1* | 7/2013 | Streeter ............ | G01S 17/36 348/208.1 |
| 2016/0104268 A1* | 4/2016 | Levin ............... | A61C 9/0066 382/107 |

OTHER PUBLICATIONS

Andrews et al., "Color Optical Flow". Proceedings of APRS Workshop on Digital Image Computing, Brisbane, Australia, vol. 1, Feb. 2003, pp. 135-139.

Barron et al., "Quantitative Color Optical Flow", Proceedings of the 16th International Conference on Pattern Recognition, Quebec, Canada, vol. 4, Aug. 11-15, 2002, pp. 251-255.

Golland et al., "Motion from Color", Computer Vision and Image Understanding, vol. 68, No. 3, Dec. 1997, pp. 346-362.

Li et al., "Learning for Optical Flow Using Stochastic Optimization", Proceedings of the $10^{th}$ European Conference on Computer Vision: Part II, Marseille, France, Oct. 12-18, 2008, pp. 379-391.

Mathews et al., "Module for Fixed Point Iteration and Newton's Method in 2D and 3D", http://math.fullerton.edu/mathews/n2003/FixPointNewtonMod.html, 9 pages.

Schoueri, "Optical Flow from Motion Blurred Color Images", Canadian Conference on Computer and Robot Vision, May 25-27, 2009, pp. 1-7.

* cited by examiner

DETERMINING OPTICAL FLOW

FIELD

The present disclosure relates generally to determining an optical flow associated with one or more images.

BACKGROUND

A camera or other image capture device can observe a three dimensional scene and project such scene onto a detector such that a series of two dimensional images are created over time. When the camera and the scene are in relative motion, the two dimensional images can change over time. The problem of tracking each point in space using such changing two dimensional images is generally known as computing the optical flow.

For example, optical flow can generally refer to a change in x-axis position and a change in y-axis position for each point within a pair of two dimensional images. An optical flow vector can describe such change in x and change in y in vector form and an optical flow field can aggregate the optical flow vectors for each point in the images. Such optical flow fields can be computed over a series of sequential images and prove useful in numerous applications, including real-time applications.

Existing methods for computing optical flow have various starting points and characteristics. For example, the Lucas-Kanade method and its derivative works use assumptions about images in grayscale. In particular, the Lucas-Kanade method assumes that optical flow is essentially constant in a local neighborhood of pixels and solves a basic optical flow equation for all pixels in the neighborhood together in a single computation. However, by assuming constant flow over a neighborhood of pixels, the Lucas-Kanade method fails to consider subpixel or single pixel changes in optical flow. Further, determining optical flow over a neighborhood of pixels using a single calculation can be computationally demanding and reduce opportunities for computational parallelizability, making such method undesirable for real-time applications. In addition, the use of grayscale images ignores color as a source of informational truth.

Other methods for computing optical flow, such as the Horn-Schunck method, include an assumption or global constraint with respect to smoothness. As a result, such methods attempt to minimize distortions in flow and prefer solutions which exhibit higher levels of smoothness. However, such assumptions and preferences with respect to smoothness inherently defeat the use of optical flow for applications such as edge detection or object segmentation.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining an optical flow. The method includes obtaining, by one or more computing devices, a plurality of input color vectors respectively associated with a plurality of input pixels, each input pixel having a known position within an image. The method further includes obtaining, by the one or more computing devices, a color rate of change associated with each input pixel in the image. The method further includes determining, by the one or more computing devices, an optical flow estimate associated with a subject pixel within the image based at least in part on the plurality of input color vectors and the color rates of change associated with the input pixels in the image.

Other example aspects of the present disclosure are directed to systems, apparatus, tangible, non-transitory computer-readable media, user interfaces, memory devices, and electronic devices for determining an optical flow.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
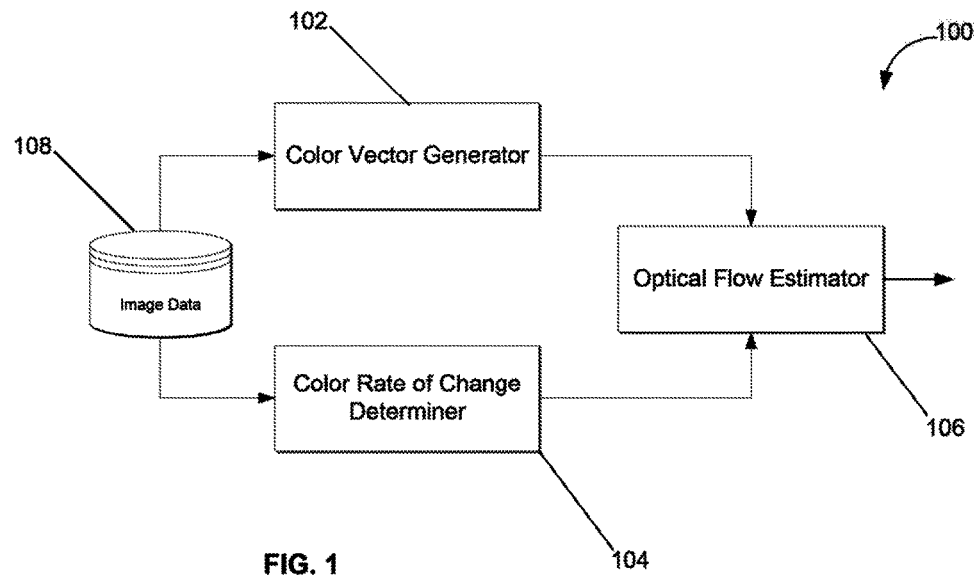
FIG. 1 depicts an example system for determining an optical flow according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to determining an optical flow associated with one or more images. In particular, the optical flow can be determined for a subject pixel in an image based at least in part on a plurality of input color vectors and color rates of change respectively associated with a plurality of input pixels associated with the image. Input color vectors and color rates of change can be obtained for a plurality of input pixels in the image. An optical flow estimate can then be determined for the subject pixel. The optical flow estimate can describe an estimated displacement per unit time of the subject pixel in continuous time. In some implementations, the optical flow estimate can be a least squares estimate of the optical flow associated with the subject pixel.

In some implementations, the input pixels can represent a quadrant of four pixels of the subject image. The input pixels can each have a color represented by a color vector associated with the input pixel. The color vector can have a plurality of components that describe the color of the input pixel. For example, the color vector can have a red intensity component, a green intensity component, and a blue intensity component respectively describing the intensities of red, green, and blue which form the color of the input pixel. As another example, the color vector can have an ultraviolet component, an infrared component, and/or other suitable components. In this manner, the color vector can be associated with any suitable color space. In addition, a color rate-of-change vector associated with a pixel in the image can have a red intensity rate-of-change component, a green intensity rate-of-change component, and a blue intensity rate-of-change component respectively describing the intensity rate-of-change of red, green, and blue which form the color rate-of-change of the input pixel. Furthermore, the color rate-of-change vector can have an ultraviolet rate-of-change component, an infrared rate-of-change component, and/or other suitable components. In this manner, the color rate-of-change vector can be associated with any suitable color space. The color spaces for the intensity and intensity rate-of-change are typically the same.

The input pixels can reside at known locations within the subject image. As indicated, an image capture device in relative motion with the scene depicted in the subject image can capture one or more subsequent images of the scene, such that the colors of corresponding input pixels (e.g. input pixels having the same position) within the one or more subsequent sequential images can change over time. In this manner, a color rate of change associated with the respective colors of the input pixels (e.g. the input color rates of change) can be determined. For instance, in some implementations, the color rate of change can be determined by one or more sensors associated with the image capture device configured or constructed to directly monitor (e.g. using one or more color rate of change sensors) the color rates of change with respect to the sequence of images captured by the image capture device. In some implementations, the color rate of change can be determined based at least in part on one or more subsequent images relative to the subject image. For instance, the color rate of change can be determined based at least in part on a difference of the color vectors of the corresponding input pixels in one or more subsequent images and one or more respective times at which the one or more subsequent images were captured relative to the subject image.

A subject pixel can be selected within the subject image. For instance, the selected subject pixel can reside at a position (x,y) within the bounds of the plurality of input pixels. The optical flow estimate with respect to the subject pixel can be determined based at least in part on the color vectors of the input pixels and the color rates of change of the input pixels. In some implementations, bilinear interpolation can be performed to interpolate a color rate of change associated with the subject pixel based at least in part on the color rates of change associated with the input pixels.

In some implementations, the subject pixel can be selected to be the pixel in the center of the quadrant formed by the input pixels. For instance, the input pixels can have relative coordinates at (0, 0), (0, 1), (1, 0), and (1, 1). The subject pixel can be selected to have a relative coordinate position of (x=0.5, y=0.5). In this manner, bilinear interpolation performed with respect to the subject pixel can correspond to an average of the input pixel values. In such implementations, the color rate of change associated with the subject pixel (e.g. the subject color rate of change) can be determined by taking an average of the input color rates of change.

According to example aspects of the present disclosure, an optical flow equation used to determine an optical flow estimate associated with the subject pixel within the input quadrant according to example aspects of the present disclosure can be can be derived by equating a measured (e.g. interpolated) bilinear formula associated with the input pixels with an estimated bilinear formula associated with the input pixels. The measured bilinear formula can correspond to the interpolated subject color vector. Both sides of the equation can be differentiated, as will be described in more detail below. Such differentiation can result in three equations having two unknowns (e.g. the optical flow), which can be solved for, for instance, using a least squares fit. In particular, the least squares fit can provide an estimated optical flow (x', y') associated with the subject pixel. As indicated, the estimated optical flow can correspond to a displacement of the subject pixel with respect to time. In this manner, the estimated optical flow can correspond to an optical flow vector describing the displacement of the subject pixel. A least squares error associated with the optical flow can be determined by plugging the optical flow (x', y') into the original equation and subtracting the measured bilinear formula.

Executing the optical flow equation for each pixel within the subject image can result in a plurality of optical flow vectors that, when aggregated, form an optical flow field depicting total optical flow between the two images. Furthermore, repeating the above described method for each pixel within a plurality of sequential images can generate an optical flow field for each sequential image. The resulting plurality of optical flow fields can depict optical flow over a substantial length of time.

It will be appreciated that the example optical flow determination techniques in accordance with example aspects of the present disclosure can be implemented in a plurality of applications. For instance, such techniques can be implemented by a real-time tracking loop associated with an image capture device. The optical flow determined for images captured by the image capture device can be used to adjust a motion of the image capture device. As another example, outputs of the present disclosure (e.g. optical flow fields, etc.) can be used to construct depth maps of areas, for instance as used in aerial 3D reconstruction, satellite imagery, etc. Such optical flow can further be used in time-to-collision estimates associated with objects depicted in the subject images. Such optical flows can further be used in various stereoscopy applications, or other suitable applications.

With reference now to the figures, example aspects of the present disclosure will be discussed in greater detail. For instance, FIG. 1 depicts an overview of an example system 100, for determining an optical flow according to example embodiments of the present disclosure. System 100 includes a color vector generator 102, a color rate of change determiner 104, and an optical flow estimator 106. In some implementations, system 100 can be implemented within, or otherwise associated with one or more computing devices. For instance, system 100 can be embedded within an opto-mechanical system having one or more processors, memory devices, sensors (e.g. position sensors, inertial measurement units, color rate of change sensors, etc.), actuators, optical components (e.g. lens, detector, etc.). For instance, in some implementations, the opto-mechanical system can include an image capture device configured to capture a plurality of sequential images of a scene. In some implementations, the image capture device can be constructed using a "fovea" (e.g. a varying pixel density that decreases from the center of the field of view). In some implementations, the system 100 can be implemented in, or otherwise associated with, one or more remote computing devices, such as one or more server devices. For instance, the one or more remote computing devices can be communicatively coupled to the opto-mechanical system (e.g. via a network).

The color vector generator 102 can be configured to measure the color contained within images, and to determine color vectors associated with a plurality of pixels in the images. For instance, the color vector generator 102 can be configured to access image data 108 to obtain one or more images. The image data 108 can be stored locally by the opto-mechanical system, and/or in one or more databases remote from the opto-mechanical system. For instance, the one or more databases can be stored in one or more server devices. In some implementations, the image data can be produced and processed in real time without the need for intervening storage. The one or more images accessed by the color vector generator can include a plurality of pixels that define the images. The color vector generator 102 can be configured to determine color vectors associated with at least a subset of the plurality of pixels in the one or more images. The color vectors can have a plurality of components that define the color of the pixels using any suitable color space, such as, for instance, RGB, CMY, HSV, YUV, RGB and infrared, RGB and ultraviolet, RGB and ultraviolet and infrared, or other suitable color spaces, including any combination of such spaces, whether trichromatic, tetrachromatic, or hyperspectral. In the particular case of the trichromatic color spaces RGB, CMY, HSV, and YUV, the transformation to a different color space will transform into a different coordinate system with the same number of dimensions, which may modify or improve the results of the optical flow computation slightly, but does not contribute any additional information to the algorithm. Conversely, adding an additional color, such as ultraviolet, to the input data, has been shown to improve the effectiveness of the algorithm.

Figure 2:
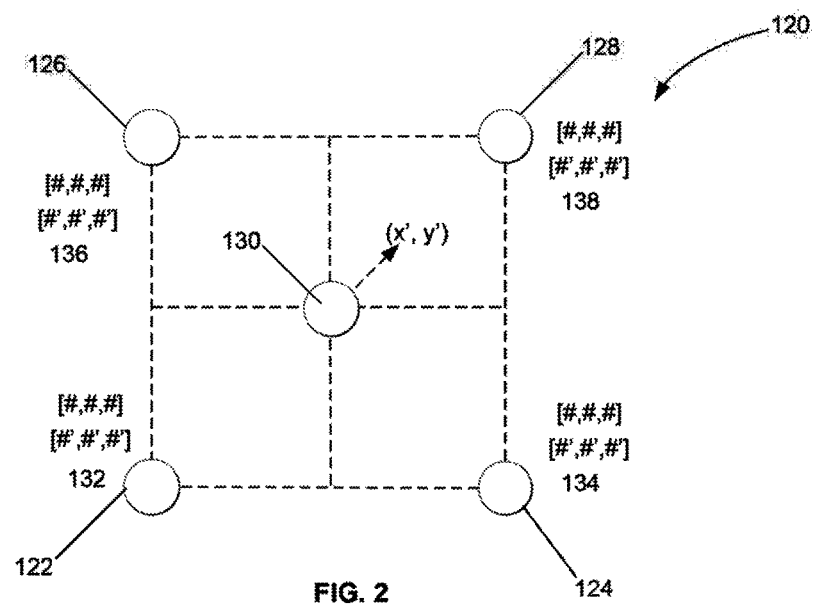
FIGS. 2-3 depict example pixel configurations according to example embodiments of the present disclosure.

For instance, color vector generator 102 can access an example image 120 depicted in FIG. 2 having one or more input pixels 122, 124, 126, and 128. The input pixels 122-128 can form a quadrant, and can each have known locations within the image 120. Such known locations can be described by a two-dimensional coordinate scale. For instance, the input pixels 122, 124, 126, and 128 can respectively have coordinates of $(x_m, y_n)$, $(x_m+1, y_n)$, $(x_m, y_n+1)$, and $(x_m+1, y_n+1)$. The color vector generator 102 can determine input color vectors 132, 134, 136, and 138 respectively describing the colors of input pixels 122, 124, 126, and 128. As shown, the input color vectors 132-138 each include three components (e.g. [#, #, #]) respectively associated with a red intensity component, a green intensity component, and a blue intensity component. It will be appreciated that the input color vectors can include any suitable number of components based at least in part on a color space of the input color vectors, such as red, green, blue, and ultraviolet. Similarly, the input color vectors have associated with color rate of change vectors having three components (e.g. [#', #', #']) respectively associated with a red intensity rate-of-change component, a green intensity rate-of-change component, and a blue intensity rate-of-change component respectively describing the intensity rate-of-change of red, green, and blue which form the color rate-of-change of the input pixels.

Referring back to FIG. 1, the color rate of change determiner 104 can be configured to determine a rate of change associated with the color vectors 132-138 of the input pixels 122-128. For instance, the input color rates of change can be determined based at least in part on one or more rate of change sensors associated with the opto-mechanical system. For instance, the rate of change sensors can be configured to determine the rate of change of the color of the input pixels in real time or near real time as the opto-mechanical system captures the plurality of images. In some implementations, the color rate of change determiner 104 can be configured to determine the color rates of change of the input pixels 122-128 based at least in part on corresponding input pixels (e.g. pixels having the same coordinates as the input pixels 122-128) in one or more subsequent images of the scene captured by the opto-mechanical system. For instance, the color rate of change determiner 104 can determine the color rate of change of the input pixels 122-128 based at least in part on determined color vectors of the corresponding input pixels and the respective times at which the one or more subsequent images were captured relative to the image 120.

Upon a determination of the input color vectors 132-138 and the input color rates of change by the color vector generator 102 and the color rate of change determiner 104, respectively, the optical flow estimator 106 can be configured to determine an estimated optical flow associated with a subject pixel 130. For instance, the optical flow estimator 106 can receive the input color vectors 132-138 and the input rates of change as input. The optical flow estimator 106 can select a subject pixel 130. The subject pixel 130 can be any suitable pixel in the image 120 located within the quadrat formed by the input pixels 122-128. For instance, in some implementations, the subject pixel 130 can be the pixel having coordinates $(x_m+0.5, y_n+0.5)$. In this manner, the subject pixel 130 can be the pixel directly in the middle of the quadrant formed by the input pixels 122-128. In some implementations, the optical flow estimator 106 can select a subject pixel location prior to a processing of the input color vectors and color rates of change associated with the input pixels.

The optical flow estimator 106 can be configured to determine the estimated optical flow associated with the subject pixel 130 based at least in part on the input color vectors 132-138 and the input color rates of change. For instance, the optical flow estimator 106 can be configured to execute an optical flow equation in accordance with example aspects of the present disclosure. In some implementations, such optical flow equation can be the following equation:

$$\begin{bmatrix} x' \\ y' \end{bmatrix} = \begin{bmatrix} \|\hat{b}_{24y}\|^2 & \hat{b}_{24y} \cdot \hat{b}_{34x} \\ \hat{b}_{24y} \cdot \hat{b}_{34x} & \|\hat{b}_{34x}\|^2 \end{bmatrix}^{-1} \begin{bmatrix} \leftarrow \hat{b}_{24y} \rightarrow \\ \leftarrow \hat{b}_{34x} \rightarrow \end{bmatrix} \begin{bmatrix} \uparrow \\ \hat{C}'_{xy} \\ \downarrow \end{bmatrix}$$

wherein the "^" term signifies a vector quantity. More particularly, as used herein, the "^" term is interchangeable with the "→" term to signify a vector quantity. The terms of the above optical flow equation can be defined as follows:

$$\vec{C}'_{xy} = \vec{b}'_1 + \vec{b}'_2 x + \vec{b}'_3 y + \vec{b}'_4 xy,$$

$$\vec{b}_{24y} = (\vec{b}_2 + \vec{b}_4 y), \text{ and}$$

$$\vec{b}_{34x} = (\vec{b}_3 + \vec{b}_4 x)$$

wherein:

$$\vec{b}_1 = \vec{f}_{00}$$

$$\vec{b}_2 = \vec{f}_{10} - \vec{f}_{00}$$

$$\vec{b}_3 = \vec{f}_{01} - \vec{f}_{00}$$

$$\vec{b}_4 = \vec{f}_{00} - \vec{f}_{10} - \vec{f}_{01} + \vec{f}_{11}$$

and wherein:

$$\vec{b}'_1 = \vec{f}'_{00}$$

$$\vec{b}'_2 = \vec{f}'_{10} - \vec{f}'_{00}$$

$$\vec{b}'_3 = \vec{f}'_{01} - \vec{f}'_{00}$$

$$\vec{b}'_4 = \vec{f}'_{00} - \vec{f}'_{10} - \vec{f}'_{01} + \vec{f}'_{11}$$

In the above, $\vec{f}_{00}$, $\vec{f}_{01}$, $\vec{f}_{10}$, and $\vec{f}_{11}$ represent the input color vectors of the input pixels associated with the subject pixel, and $\vec{f}'_{00}$, $\vec{f}'_{01}$, $\vec{f}'_{10}$, and $\vec{f}'_{11}$ represent the color rates of change associated with the input pixels. The terms $\vec{f}_{00}$, $\vec{f}_{01}$, $\vec{f}_{10}$, and $\vec{f}_{11}$ and $\vec{f}'_{00}$, $\vec{f}'_{01}$, $\vec{f}'_{10}$, and $\vec{f}'_{11}$ are vector-valued quantities wherein the number of components of the vector is equal to the number of colors in the color space under consideration. For instance, when processing RGB data, the above vector terms will each have three quantities or components representing the red, green, and blue color intensities and corresponding color rates of change. As another example, when processing data associated with a color space using 4 colors, such as RGB+ultraviolet, the above vector terms will have 4 quantities or components.

The above optical flow equation can be derived according to example aspects of the present disclosure. As one example, referring particularly to FIG. 2, such optical flow equation can be derived for the subject pixel 130, by performing bilinear interpolation on the subject pixel 130 to determine a color vector associated with the subject pixel 130. For instance, a bilinear formula can be determined based upon the input color vectors, and the position of the subject pixel 130 within the image 120. As an example, the bilinear formula can take the following form:

$$\vec{b}_1 + \vec{b}_2 x + \vec{b}_3 y + \vec{b}_4 xy$$

wherein $\vec{b}_1$ equals input color vector 132 (e.g., $\vec{f}_{00}$); $\vec{b}_2$ equals input color vector 134 minus input color vector 132 (e.g., $\vec{f}_{10} - \vec{f}_{00}$); $\vec{b}_3$ equals input color vector 136 minus input color vector 132 (e.g., $\vec{f}_{01} - \vec{f}_{00}$); and $\vec{b}_4$ equals input color vector 132 minus input color vector 134 minus input color vector 136 plus input color vector 138 (e.g., $\vec{f}_{00} - \vec{f}_{10} - \vec{f}_{01} + \vec{f}_{11}$). Such bilinear formula outputs an estimated color vector for any suitable position (x,y) by bilinearly interpolating input color vectors 132, 134, 136, and 138. For instance, the bilinear formula can output an estimated color vector for the position $(x_m+0.5, y_n+0.5)$ of the subject pixel 130.

According to example aspects of the present disclosure, the optical flow of the subject pixel 130 can be determined by setting the bilinear formula equal to itself as follows:

$$\vec{b}_1 + \vec{b}_2 x + \vec{b}_3 y + \vec{b}_4 xy = \vec{b}_1 + \vec{b}_2 x + \vec{b}_3 y + \vec{b}_4 xy$$

wherein the left hand side of the equation corresponds to the measured (e.g. interpolated) output color of the subject pixel 130, and wherein the right hand side of the equation corresponds to a predicted or estimated optical flow associated with the subject pixel 130. Both sides of the equation can be differentiated with respect to time. In particular, the left hand side of the equation can be differentiated, allowing the colors to vary with time while holding x and y (e.g. the position of the subject pixel) constant. The right hand side of the equation can be differentiated, allowing x and y to vary, while holding the colors constant. For instance, the differentiated equation can take the following form:

$$\vec{b}'_1 + \vec{b}'_2 x + \vec{b}'_3 y + \vec{b}'_4 x y = \vec{b}_2 x' + \vec{b}_3 y' + \vec{b}_4 x' y + \vec{b}_4 x y'$$

wherein $\vec{b}'_1$ is the rate of change of $b_1$ with respect to time (dt), and x' is the rate of change of x with respect to time (dt). In this manner, $b'_1$, $b'_2$, $b'_3$, and $b'_4$, and $b_1$, $b_2$, $b_3$, and $b_4$ are known (vector-valued) inputs, while x' and y' are (scalar-valued) unknowns representing the optical flow. For instance, $b_1$, $b_2$, $b_3$, and $b_4$ correspond to the input color vectors determined by the color vector generator 102, and $b'_1$, $b'_2$, $b'_3$, and $b'_4$ correspond to the input color rates of change determined by the color rate of change determiner 104. In addition, x and y represent the known position of the subject pixel 130. The optical flow can be determined, for instance, by solving for x' and y' in terms of the other quantities.

The above equation can be cast into matrix form to perform a least squares fit on the equation. For instance, the terms can be grouped around x' and y' as follows:

$$\vec{b}'_1 + \vec{b}'_2 x + \vec{b}'_3 y + \vec{b}'_4 xy = (\vec{b}_2 + \vec{b}_4 y)x' + (\vec{b}_3 + \vec{b}_4 x)y'$$

and the following terms can be defined:

$$\vec{C}'_{xy} = \vec{b}'_1 + \vec{b}'_2 x + \vec{b}'_3 y + \vec{b}'_4 xy,$$

$$\vec{b}_{24y} = (\vec{b}_2 + \vec{b}_4 y); \text{ and}$$

$$\vec{b}_{34x} = (\vec{b}_3 + \vec{b}_4 x)$$

Substituting such terms into the above equation gives:

$$\vec{C}'_{xy} = \vec{b}_{24y} x' + \vec{b}_{34x} y'$$

The above equation can be expanded into a plurality of scalar equations. The number of scalar equations can be determined based at least in part on a color space associated with the color vectors 132-138. For instance, if an RGB color space is used, the above equation can be expanded into three scalar equations as follows:

$$C'_{xyR} = b_{24yR} x' + b_{34xR} y'$$

$$C'_{xyG} = b_{24yG} x' + b_{34xG} y'$$

$$C'_{xyB} = b_{24yB} x' + b_{34xB} y'$$

wherein "R" is a subscript for red intensity, "G" is a subscript for green intensity, and "B" is a subscript for blue intensity. It will be appreciated that various other suitable color spaces can be used.

The scalar equations can then be cast into matrix form as follows:

$$\begin{bmatrix} C'_{xyR} \\ C'_{xyG} \\ C'_{xyB} \end{bmatrix} = \begin{bmatrix} b_{24yR} & b_{34xR} \\ b_{24yG} & b_{34xG} \\ b_{24yB} & b_{34xB} \end{bmatrix} \begin{bmatrix} x' \\ y' \end{bmatrix}$$

As indicated, a least squares fit can be performed on the matrix equation to determine the optical flow. For instance, a standard least squares formula of $$\hat{\beta} = (X^T X)^{-1} X^T y = X^+ y$$

Can be used to solve for x' and y' as follows:

$$\begin{bmatrix} x' \\ y' \end{bmatrix} = \left\{ \begin{bmatrix} b_{24yR} & b_{24yG} & b_{24yB} \\ b_{34xR} & b_{34xG} & b_{34xB} \end{bmatrix} \begin{bmatrix} b_{24yR} & b_{34xR} \\ b_{24yG} & b_{34xG} \\ b_{24yB} & b_{34xB} \end{bmatrix} \right\}^{-1} \begin{bmatrix} b_{24yR} & b_{24yG} & b_{24yB} \\ b_{34xR} & b_{34xG} & b_{34xB} \end{bmatrix} \begin{bmatrix} C'_{xyR} \\ C'_{xyG} \\ C'_{xyB} \end{bmatrix}$$

or in a more succinct vector form:

$$\begin{bmatrix} x' \\ y' \end{bmatrix} = \begin{bmatrix} \|\hat{b}_{24y}\|^2 & \hat{b}_{24y} \cdot \hat{b}_{34x} \\ \hat{b}_{24y} \cdot \hat{b}_{34x} & \|\hat{b}_{34x}\|^2 \end{bmatrix}^{-1} \begin{bmatrix} \leftarrow \hat{b}_{24y} \rightarrow \\ \leftarrow \hat{b}_{34x} \rightarrow \end{bmatrix} \begin{bmatrix} \uparrow \\ \hat{C}'_{xy} \\ \downarrow \end{bmatrix}$$

wherein the "^" term signifies a vector quantity.

According to example aspects of the present disclosure, the optical flow estimator 106 can execute such equation for x' and y' to determine the optical flow estimate for the subject pixel 130. It will be appreciated that such equation can be solved using standard matrix operations. The optical flow (x', y') can be linearly proportional to the rate of change of the colors, which can facilitate an accommodation of an optical flow determination at any speed. In this manner, the optical flow determination can be determined independent of the frame rate of the sequential images captured by the opto-mechanical system. It will be appreciated that such optical flow determination technique can be extended for use on color vectors having more than three colors (e.g. 4 colors, 5 colors, etc.).

The least squares error can then be determined based at least in part on the optical flow (x', y') and the original color output $\vec{C'}_{xy}$. For instance, the least squares error can be determined by plugging [x', y'] back into the original formula, and subtracting $\vec{C'}_{xy}$. It will be appreciated that the determined error may have an error, but the error determined by such single iteration can be sufficient in determining the optical flow. In some implementations, if the determined error is greater than an error threshold, one or more additional iterations can be performed.

Figure 3:
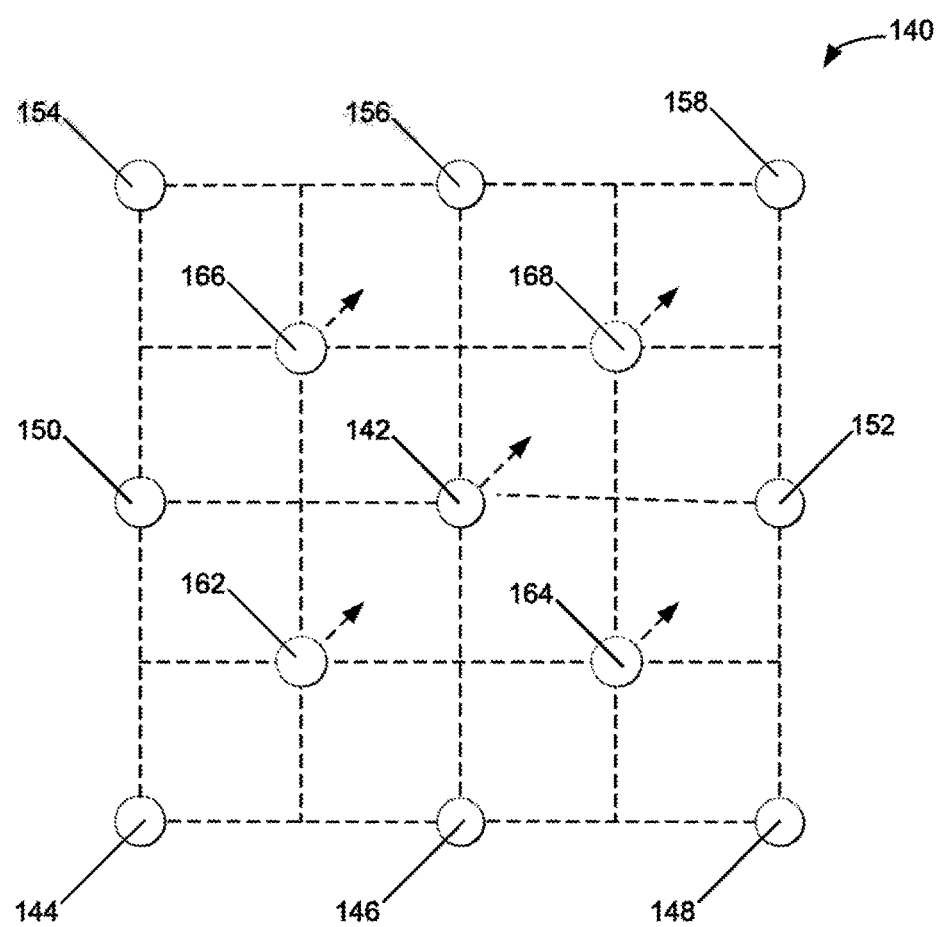

In some implementations, the optical flow of a subject pixel can be determined based at least in part on more than four input pixels. For instance, FIG. 3 depicts a portion of a subject image 140 according to example embodiments of the present disclosure. FIG. 3 depicts a subject pixel 142 along with input pixels 144, 146, 148, 150, 152, 154, 156, 158, and 160. FIG. 3 further depicts intermediate pixels 162, 164, 166, and 168. According to example aspects of the present disclosure, optical flows can be determined for the intermediate pixels 162-168 in accordance with example embodiments of the present disclosure. The optical flows of the intermediate pixels 162-168 can be averaged to determine the optical flow of the subject pixel 142. For instance, the intermediate pixels 162-168 can be equidistant from the subject pixel 142. The input pixels 144-160 and the subject pixel 142 can form respective quadrants around the intermediate pixels 162-168. In this manner, the computations can be symmetric, taking into account each input pixel 144-160.

Figure 4:
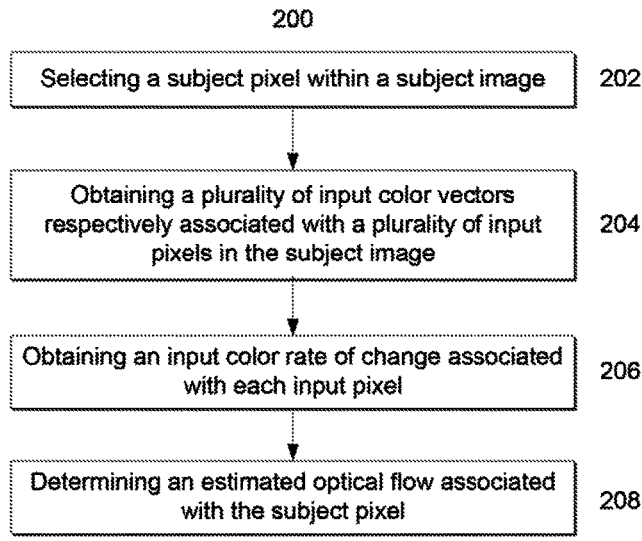
FIG. 4 depicts a flow diagram of an example method of determining an optical flow according to example embodiments of the present disclosure.

FIG. 4 depicts a flow diagram of an example method (200) of determining an optical flow according to example embodiments of the present disclosure. Method (200) can be implemented by one or more computing devices, such as one or more of the computing devices depicted in FIG. 7. In particular implementations, the method (200) can be implemented by the optical flow estimator 106 depicted in FIG. 1. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include selecting a subject pixel location in a subject image for which an optical flow is to be determined. For instance, the subject image can include a plurality of pixels that define the image. The subject pixel location can be a location associated with any suitable pixel within the subject image.

At (204), method (200) can include obtaining a plurality of input color vectors respectively associated with a plurality of input pixels in a subject image. The input pixels can be determined such that an optical flow of the subject pixel can be determined based at least in part on the color vectors of the input pixels. In this manner, the subject pixel can be located proximate the input pixels (e.g. located within a grouping of the input pixels), such that bilinear interpolation can be performed to determine a color vector describing the color of the subject pixel based on the input color vectors. In some implementations, the input pixels can form one or more quadrants. For instance, four input pixels can be evenly spaced relative to each other and can form a square quadrant. In this manner, the quadrant can be formed around the subject pixel. In some implementations, the subject pixel can be the pixel located equidistant from the input pixels. For instance, the input pixels can be located at coordinates of (0, 0), (0, 1), (1, 0), and (1, 1). In such instance, the selected subject pixel can be the pixel located at (0.5, 0.5). In this manner, the bilinear interpolation performed to determine the color rate of change vector of the subject pixel can correspond to an average of the input color rate of change vectors. Such selection of the subject pixel can facilitate a simpler and more efficient determination of the interpolated color rate of change vector of the subject pixel. The average color at (0.5, 0.5) may not be explicitly computed as part of the algorithm execution, although it may be implicitly present as part of the derivation.

The input color vectors can respectively describe a color of the input pixels based on any suitable color space. For instance, the input color vectors can describe the colors using RGB, CMY, HSV, YUV, RGB and infrared, RGB and ultraviolet, RGB and ultraviolet and infrared, or other suitable color spaces, including any combination of such spaces, whether trichromatic, tetrachromatic, or hyperspectral.

At (206), method (200) can include obtaining an input color rate of change associated with each input pixel. The color rates of change can describe how the colors of the input pixels change with respect to time. For instance, the subject image can be captured by an image capture device in relative motion with a scene. In this manner, the subject image can depict the scene. One or more subsequent images captured by the image capture device at subsequent times relative to the subject image while the image capture device was in relative motion with the scene can depict the scene at the subsequent times. The color rates of change of input pixels can describe a manner in which the colors of the input pixels change with respect to the one or more subsequent images relative to the subject image, or can be measured directly by the imaging device. For instance, the color rates of change can be directly determined by one or more sensors associated with the image capture device. In some implementations, the color rates of change can be determined based at least in part on the subsequent images captured by the image capture device. For instance, the color rates of change can be determined based at least in part on the color vectors of the pixels of the subsequent image(s) respectively corresponding to the input pixels of the subject image, and a time at which the subsequent images were captured.

In some implementations, the steps (204) and (206) can be performed substantially simultaneously. In this manner, the method (200) can include obtaining the plurality of input color vectors and the plurality of input color rate of change vectors respectively associated with the input color vectors in a single step. Further, as indicated above, various other suitable method steps described herein can be adapted, rearranged, expanded, omitted, or modified in various ways without deviating from the scope of the present disclosure.

At (208), the method (200) can include determining an estimated optical flow associated with the subject pixel based at least in part on the input color vectors and the input color rates of change. The optical flow estimate can be determined by executing an optical flow equation derived according to example aspects of the present disclosure. For instance, the optical flow estimate for the subject pixel can be determined by executing the following formula:

$$\begin{bmatrix} x' \\ y' \end{bmatrix} = \begin{bmatrix} \|\hat{b}_{24y}\|^2 & \hat{b}_{24y} \cdot \hat{b}_{34x} \\ \hat{b}_{24y} \cdot \hat{b}_{34x} & \|\hat{b}_{34x}\|^2 \end{bmatrix}^{-1} \begin{bmatrix} \leftarrow \hat{b}_{24y} \rightarrow \\ \leftarrow \hat{b}_{34x} \rightarrow \end{bmatrix} \begin{bmatrix} \uparrow \\ \hat{C}'_{xy} \\ \downarrow \end{bmatrix}$$

wherein the "^" term signifies a vector quantity. The quantities in the above equation are defined above. In this manner, one or more processors can be configured to perform one or more computations to execute such equation with respect to the subject pixel. As will be appreciated by those skilled in the art, such equation can be executed using standard matrix-based computations.

As will be described in greater detail with regard to the method (300) depicted in FIG. 5, the above optical flow equation can be derived by setting the bilinear formula used to interpolate the subject color vector as equal to the corresponding bilinear formula used to estimate the optical flow, and the both sides of the equation can be differentiated with respect to time. The differentiated equation can be cast into matrix form. It will be appreciated that the optical flow can be determined using any suitable technique taking into account the input color vectors and the input color rates of change of the input pixels with respect to the subject pixel.

Figure 5:
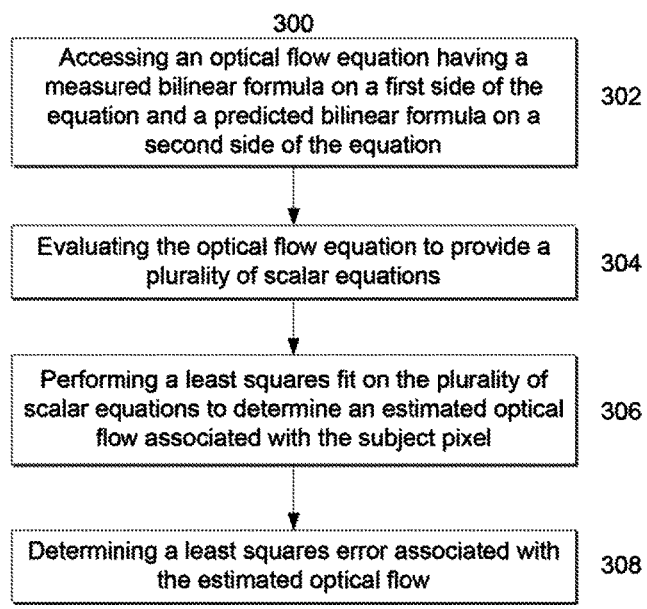
FIG. 5 depicts a flow diagram of an example method of determining an optical flow according to example embodiments of the present disclosure.

FIG. 5 depicts a flow diagram of an example method (300) of deriving an optical flow equation used to determine an optical flow estimate of a subject pixel according to example embodiments of the present disclosure. Method (300) can be implemented by one or more computing devices, such as one or more of the computing devices depicted in FIG. 7. In particular implementations, the method (300) can be implemented by the optical flow estimator 106 depicted in FIG. 1. In addition, FIG. 5 depicts steps performed in a particular order for purposes of illustration and discussion.

At (302), method (300) can include accessing an optical flow equation having a measured bilinear formula on a first side of the equation and a predicted bilinear formula on a second side of the equation. For instance, the optical flow equation can correspond to the following:

$$\vec{b}_1 + \vec{b}_2 x + \vec{b}_3 y + \vec{b}_4 x\, y = \vec{b}_1 + \vec{b}_2 x + \vec{b}_3 y + \vec{b}_4 x\, y$$

wherein $\vec{b}_1$ equals a first input color vector, $\vec{b}_2$ equals a second input color vector minus the first input color vector, $\vec{b}_3$ equals a third input color vector minus the first input color vector 132, and $\vec{b}_4$ equals the first input color vector minus the second input color vector minus the third input color vector plus a fourth input color vector (e.g. as described above with regard to FIG. 1). As indicated, the input color vectors can respectively describe the colors of four input pixels used to estimate the optical flow of the subject pixel. In this manner, it will be appreciated that various suitable bilinear formulas can be used based at least in part on the input pixels and the subject pixel.

At (304), method (300) can include evaluating the optical flow equation to provide a plurality of scalar equations. The scalar equations can be associated with a subject color space. For instance, evaluating the optical flow equation can include determining or a differentiated optical flow as follows:

$$\vec{b}'_1 + \vec{b}'_2 x + \vec{b}'_3 y + \vec{b}'_4 x\, y = \vec{b}_2 x' + \vec{b}_3 y' + \vec{b}_4 x' y + \vec{b}_4 x\, y'$$

wherein $\vec{b}'_1$ is the rate of change of $b_1$ with respect to time (dt), and x' is the rate of change of x with respect to time (dt). In this manner, $b'_1$, $b'_2$, $b'_3$, and $b'_4$, and $b_1$, $b_2$, $b_3$, and $b_4$ are known (vector-valued) inputs derived according to example aspects of the present disclosure, while x' and y' are (scalar-valued) unknowns representing the optical flow, and are outputs of the algorithm.

Such differentiated equation can yield the following:

$$\vec{C}'_{xy} = \vec{b}_{24y} x' + \vec{b}_{34x} y'$$

wherein:

$$\vec{C}'_{xy} = \vec{b}'_1 + \vec{b}'_2 x + \vec{b}'_3 y + \vec{b}'_4 x\, y,$$

$$\vec{b}_{24y} = (\vec{b}_2 + \vec{b}_4 y), \text{ and}$$

$$\vec{b}_{34x} = (\vec{b}_3 + \vec{b}_4 x)$$

The differentiated equation can then be expanded into the following scalar equations:

$$C'_{xyR} = b_{24yR} x' + b_{34xR} y'$$

$$C'_{xyG} = b_{24yG} x' + b_{34xG} y'$$

$$C'_{xyB} = b_{24yB} x' + b_{34xB} y'$$

At (306), method (300) can include performing a least squares fit on the plurality of scalar equations to determine an estimated optical flow associated with the subject pixel. For instance, the scalar equations can be cast into matrix form as follows:

$$\begin{bmatrix} C'_{xyR} \\ C'_{xyG} \\ C'_{xyB} \end{bmatrix} = \begin{bmatrix} b_{24yR} & b_{34xR} \\ b_{24yG} & b_{34xG} \\ b_{24yB} & b_{34xB} \end{bmatrix} \begin{bmatrix} x' \\ y' \end{bmatrix}$$

A least squares fit can be performed on the matrix equation, which can yield the following:

$$\begin{bmatrix} x' \\ y' \end{bmatrix} =$$

$$\left\{ \begin{bmatrix} b_{24yR} & b_{24yG} & b_{24yB} \\ b_{34xR} & b_{34xG} & b_{34xB} \end{bmatrix} \begin{bmatrix} b_{24yR} & b_{34xR} \\ b_{24yG} & b_{34xG} \\ b_{24yB} & b_{34xB} \end{bmatrix} \right\}^{-1} \begin{bmatrix} b_{24yR} & b_{24yG} & b_{24yB} \\ b_{34xR} & b_{34xG} & b_{34xB} \end{bmatrix} \begin{bmatrix} C'_{xyR} \\ C'_{xyG} \\ C'_{xyB} \end{bmatrix}$$

or in a more succinct vector form:

$$\begin{bmatrix} x' \\ y' \end{bmatrix} = \begin{bmatrix} \|\hat{b}_{24y}\|^2 & \hat{b}_{24y} \cdot \hat{b}_{34x} \\ \hat{b}_{24y} \cdot \hat{b}_{34x} & \|\hat{b}_{34x}\|^2 \end{bmatrix}^{-1} \begin{bmatrix} \leftarrow \hat{b}_{24y} \rightarrow \\ \leftarrow \hat{b}_{34x} \rightarrow \end{bmatrix} \begin{bmatrix} \uparrow \\ \hat{C}'_{xy} \\ \downarrow \end{bmatrix}$$

wherein the "^" term signifies a vector quantity, and the formula generalizes to any number of colors.

Such equation can be solved for x' and y' to determine the optical flow. Such optical flow determination technique is intended for illustrative purposes. It will be appreciated that various suitable techniques taking into account the input color vectors and the input color rates of change of the input pixels with respect to the subject pixel can be used to determine the optical flow of the subject pixel.

At (308), method (300) can include determining a least squares error associated with the estimated optical flow. For instance, in some implementations, determining the least squares error can include plugging x' and y' back into $\vec{C}'_{xy} = \vec{b}_{24y}x' + \vec{b}_{34x}y'$. Such error can then be converted from the color rate of change space to an optical flow space. It will be appreciated that the least squares error can be determined using any suitable technique.

Figure 6:
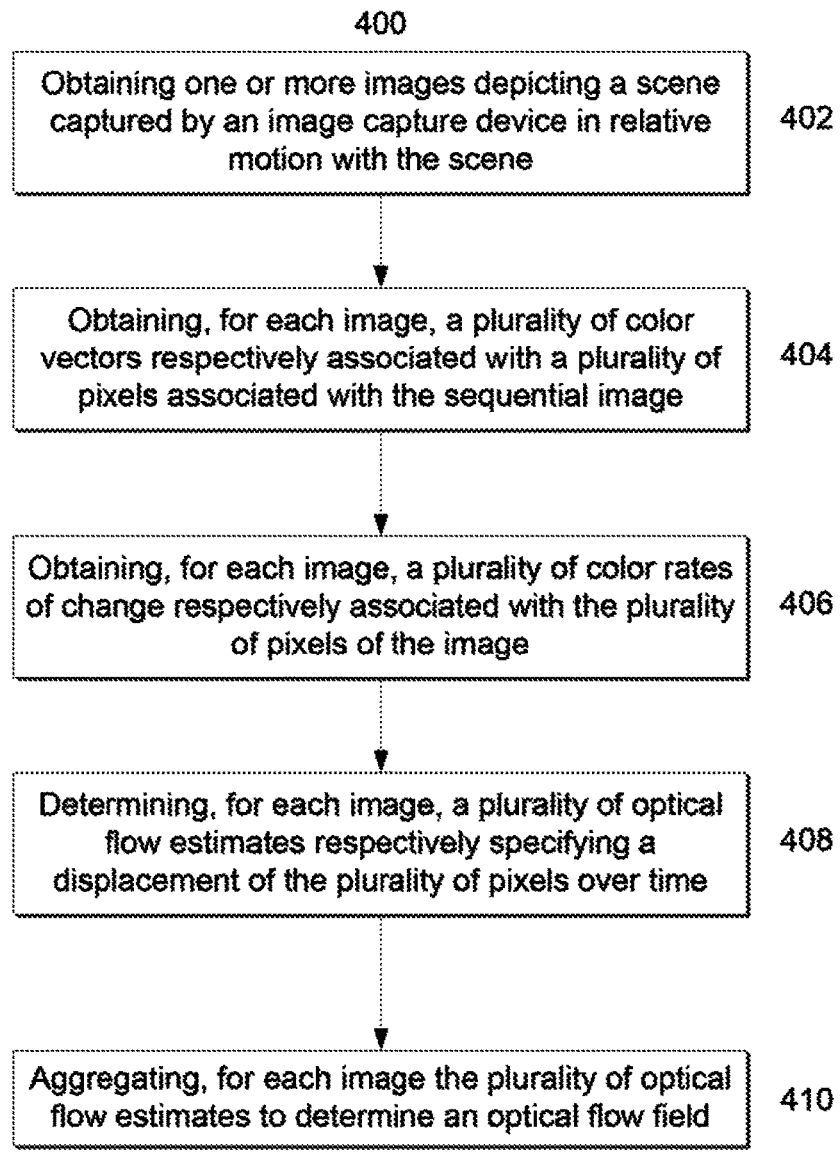
FIG. 6 depicts a flow diagram of an example method of determining an optical flow field associated with one or more images according to example embodiments of the present disclosure.

FIG. 6 depicts a flow diagram of an example method (400) of generating a plurality of optical flow fields according to example embodiments of the present disclosure. Method (400) can be implemented by one or more computing devices, such as one or more of the computing devices depicted in FIG. 7. In addition, FIG. 6 depicts steps performed in a particular order for purposes of illustration and discussion.

At (402), method (400) can include obtaining one or more images depicting a scene captured by an image capture device in relative motion with the scene. For instance, a data collection device, such as an image capture device can capture a plurality of sequential images based upon visual imagery associated with the scene collected by a sensor of the image capture device. In particular, the images can be captured such that they depict the scene at different times. Such one or more obtained images can be one or more images from the plurality of sequential images. The plurality of sequential images can be stored locally on one or more memory devices associated with the image capture device, and/or in one or more remote databases separate from the image capture device.

At (404), method (400) can include obtaining, for each image, a plurality of color vectors respectively associated with a plurality of pixels associated with the image. Each image can include a plurality of pixels defining the visual imagery depicted in the image. Color vectors for at least a subset of the plurality of pixels in each image can be obtained. As indicated, the color vectors can describe the color of the pixel in any suitable color space.

At (406), method (400) can include obtaining, for each image, a plurality of color rates of change respectively associated with the plurality of pixels of the image. The color rates of change can describe how the colors of the pixels change over time, and can be determined based at least in part on the relative motion between the image capture device and the scene. In some implementations, the color rates of change can be determined using one or more sensors associated with the image capture device.

At (408), method (400) can include determining, for each image, a plurality of optical flow estimates respectively specifying a displacement of the plurality of pixels over time. For instance, the optical flow estimates can take the form of optical flow vectors associated with each pixel, and can be determined in accordance with example aspects of the present disclosure.

At (410), method (400) can include aggregating, for each image, the plurality of optical flow estimates associated with the image to determine an optical flow field for the image. The optical flow field can describe an aggregate optical flow of the image. The optical flow field can include optical flow vectors associated with each pixel of the image and, therefore, depict total optical flow associated with the image.

Figure 7:
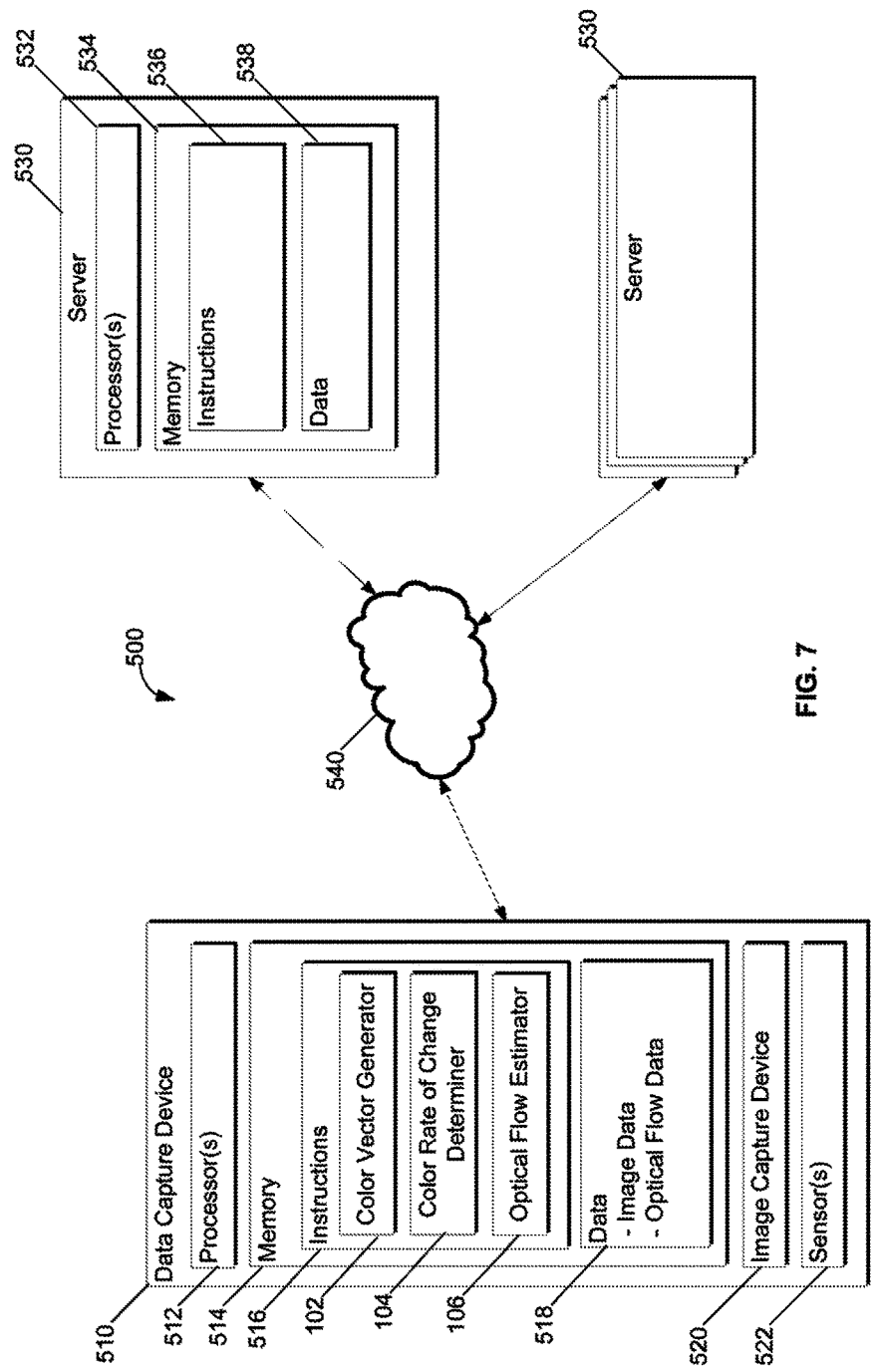
FIG. 7 depicts an example system according to example embodiments of the present disclosure.

FIG. 7 depicts an example computing system 500 that can be used to implement the methods and systems according to example aspects of the present disclosure. The system 500 can be implemented using a client-server architecture that includes a data capture device 510 that communicates with one or more remote devices 530 over a network 540. The system 500 can be implemented using other suitable architectures, such as a single computing device.

The system 500 includes a data capture device 510, The data capture device 510 can be, or can be associated with, any suitable computing device, such as a general purpose computer, special purpose computer, laptop, desktop, mobile device, navigation system, smartphone, tablet, wearable computing device, a display with one or more processors, or other suitable computing device. In some implementations, the data capture device 510 can be an opto-mechanical device, and can include an image capture device configured to sense and collect visual imagery information, including color information. The data capture device 510 can have one or more processors 512 and one or more memory devices 514. The data capture device 510 can also include a network interface used to communicate with one or more remote devices 530 over the network 540. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, graphics processing units (GPUs) dedicated to efficiently rendering images or performing other specialized calculations, and/or other suitable processing device. The one or more memory devices 514 can include one or more computer-readable media, including, but not limited to, non-transitory computer-readable media, RAM, ROM, hard drives, flash drives, or other memory devices. The one or more memory devices 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to implement the color vector generator 102, the color rate of change determiner 104 and the optical flow estimator 106 described with reference to FIG. 1.

As shown in FIG. 7, the one or more memory devices 514 can also store data 518 that can be retrieved, manipulated, created, or stored by the one or more processors 512. The data 518 can include, for instance, image data, optical flow data generated according to example aspects of the present disclosure, and other data. The data 518 can be stored in one or more databases. The one or more databases can be implemented within the data capture device 510, or can be connected to the data capture device 510 by a high bandwidth LAN or WAN, or can also be connected to data capture device 510 through network 540. The one or more databases can be split up so that they are located in multiple locales.

The data capture device 510 can include various input/output devices for providing and receiving information from a user, such as a touch screen, touch pad, data entry keys, speakers, and/or a microphone suitable for voice recognition. For instance, the remote device 530 can have a display device for presenting a user interface.

The data capture device 510 can exchange data with one or more remote devices 530 over the network 540. For instance, a remote device can be a server, such as a web server. Although two remote devices 530 are illustrated in FIG. 7, any number of remote devices 530 can be connected to the data capture device 510 over the network 540.

Similar to the data capture device 510, a remote device 530 can include one or more processor(s) 532 and a memory 534. The one or more processor(s) 532 can include one or more central processing units (CPUs), and/or other processing devices. The memory 534 can include one or more computer-readable media and can store information accessible by the one or more processors 532, including instructions 536 that can be executed by the one or more processors 532 and data 538.

In some implementations, one or more of the color vector generator 102, the color rate of change determiner 104, and the optical flow estimator 106 can be implemented within the remote device 530. In this manner, the functionality associated with the one or more of the color vector generator 102, the color rate of change determiner 104, and the optical flow estimator 106 can be performed by the remote device 530. For instance, the data capture device 510 can communicate with the remote device 530 to implement example aspects of the present disclosure.

The remote device 530 can also include a network interface used to communicate with one or more remote computing devices (e.g. data capture device 510) over the network 540. The network interface can include any suitable components for interfacing with one more networks, including for example, transmitters, receivers, ports, controllers, antennas, or other suitable components.

The network 540 can be any type of communications network, such as a local area network (e.g. intranet), wide area network (e.g. Internet), cellular network, or some combination thereof. The network 540 can also include a direct connection between a remote device 530 and the data capture device 510. In general, communication between the data capture device 510 and a remote device 530 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of forming an optical flow vector describing estimated displacement of a subject pixel, the method comprising:

obtaining, by one or more computing devices, a plurality of input color vectors respectively associated with a plurality of input pixels, each input pixel having a known position within an image captured by an image capture device;

obtaining, by the one or more computing devices, a plurality of color rates of change respectively associated with the plurality of input pixels in the image;

determining, by the one or more computing devices, an optical flow estimate associated with a subject pixel within the image based at least in part on the plurality of input color vectors and the color rates of change associated with the input pixels in the image; and controlling, by the one or more computing devices, a motion of the image capture device based at least in part on the optical flow estimate associated with the subject pixel within the image.

2. The computer-implemented method of claim 1, wherein determining, by the one or more computing devices, the optical flow estimate comprises:

accessing, by the one or more computing devices, an optical flow equation having a measured bilinear formula on a first side of the equation and a predicted bilinear formula on a second side of the equation; and evaluating, by the one or more computing devices, the optical flow equation to provide a plurality of scalar equations.

3. The computer-implemented method of claim 2, wherein evaluating, by the one or more computing devices, the optical flow equation to provide a plurality of scalar equations comprises determining a differentiated optical flow equation wherein each side of the differentiated optical flow equation is differentiated with respect to time.

4. The computer-implemented method of claim 3, wherein the differentiated optical flow equation comprises the following equation:

$$\vec{b}'_1+\vec{b}'_2 x+\vec{b}'_3 y+\vec{b}'_4 x\,y=\vec{b}_2 x'+\vec{b}_3 y'+\vec{b}_4 x'y+\vec{b}_4 x\,y'.$$

5. The computer-implemented method of claim 4, wherein:

$\vec{b}_1$ equals a first input color vector associated with a first input pixel;

$\vec{b}_2$ equals a second input color vector associated with a second input pixel minus the first input color vector;

$\vec{b}_3$ equals a third input color vector associated with a third input pixel minus the first input color vector; and $\vec{b}_4$ equals the first input color vector minus the second input color vector minus the third input color vector plus a fourth input color vector associated with a fourth input pixel.

6. The computer-implemented method of claim 5, wherein evaluating, by the one or more computing devices, the optical flow equation to provide a plurality of scalar equations comprises expanding the differentiated optical flow equation into a plurality of scalar equations.

7. The computer-implemented method of claim 6, wherein determining, by the one or more computing devices, the optical flow estimate comprises performing, by the one or more computing devices, a least squares fit on a plurality of scalar equations associated with the optical flow equation.

8. The computer-implemented method of claim 7, wherein the least squares fit is performed by solving the following equation:

$$\begin{bmatrix} x' \\ y' \end{bmatrix} = \begin{bmatrix} \|\hat{b}_{24y}\|^2 & \hat{b}_{24y} \cdot \hat{b}_{34x} \\ \hat{b}_{24y} \cdot \hat{b}_{34x} & \|\hat{b}_{34x}\|^2 \end{bmatrix}^{-1} \begin{bmatrix} \leftarrow \hat{b}_{24y} \rightarrow \\ \leftarrow \hat{b}_{34x} \rightarrow \end{bmatrix} \begin{bmatrix} \uparrow \\ \hat{C}'_{xy} \\ \downarrow \end{bmatrix}.$$

9. The computer-implemented method of claim 5, further comprising determining a least squares error based at least in part on the optical flow estimate.

10. The computer-implemented method of claim 1, wherein the input color vectors each comprise three components respectively associated with a red intensity component, a green intensity component, and a blue intensity component.

11. The computer-implemented method of claim 1, wherein the input color vectors each comprises a plurality of components, and wherein at least one of the components is associated with an infrared intensity component, an ultraviolet intensity component, a multi-band intensity component, or a hyperspectral intensity component.

12. The computer-implemented method of claim 1, further comprising determining, by the one or more computing devices, an interpolated color vector associated with the subject pixel.

13. The computer-implemented method of claim 1, wherein the color rates of change respectively associated with the plurality of input pixels respectively describe one or more differences, with respect to time, between the color vectors associated with the input pixels and one or more subsequent color vectors associated with one or more corresponding input pixels in one or more subsequent images captured at respective times by the image capture device.

14. A computing system, comprising:
an image capture device;
one or more processors; and
one or more memory devices, the one or more memory devices storing computer-readable instructions that when executed by the one or more processors cause the one or more processors to perform operations, the operations comprising:
obtaining a plurality of input color vectors respectively associated with a plurality of input pixels, each input pixel having a known position within an image captured by the image capture device;
obtaining a plurality of color rates of change respectively associated with the plurality of input pixels in the image;
determining an optical flow estimate associated with a subject pixel within the image based at least in part on the plurality of input color vectors and the color rates of change associated with the input pixels in the image; and
controlling a motion of the image capture device based at least in part on the optical flow estimate associated with the subject pixel within the image.

15. The computing system of claim 14, wherein determining an optical flow estimate comprises:
accessing an optical flow equation having a measured bilinear formula on a first side of the equation and a predicted bilinear formula on a second side of the equation; and
evaluating the optical flow equation to provide a plurality of scalar equations.

16. The computing system of claim 15, wherein evaluating the optical flow equation to provide a plurality of scalar equations comprises determining a differentiated optical flow equation wherein each side of the differentiated optical flow equation is differentiated with respect to time.

17. The computing system of claim 14, wherein the operations further comprise determining a time-to-collision estimate with respect to an object depicted in the image based at least in part on the optical flow estimate associated with the subject pixel within the image.

18. The computing system of claim 14, wherein the operations further comprise performing a real-time tracking loop based at least in part on the optical flow estimate associated with the subject pixel within the image.

19. The computing system of claim 14, wherein the operations further comprise constructing a depth map of an area based at least in part on the optical flow estimate associated with the subject pixel within the image.

20. One or more tangible, non-transitory computer-readable media storing computer-readable instructions that when executed by one or more processors cause the one or more processors to perform operations, the operations comprising:
obtaining a plurality of input color vectors respectively associated with a plurality of input pixels, each input pixel having a known position within an image captured by an image capture device;
obtaining a plurality of color rates of change respectively associated with the plurality of input pixels in the image;
determining an optical flow estimate associated with a subject pixel within the image based at least in part on the plurality of input color vectors and the color rates of change associated with the input pixels in the image; and controlling a motion of the image capture device based at least in part on the optical flow estimate associated with the subject pixel within the image.

* * * * *